United States Patent [19]

Kitayama

[11] Patent Number: 5,439,297
[45] Date of Patent: Aug. 8, 1995

[54] NONMAGNETIC RACEWAY ASSEMBLY

[75] Inventor: Azuyasu Kitayama, Ibaragi, Japan

[73] Assignee: Nippon Thompson Co., Ltd., Tokyo, Japan

[21] Appl. No.: 252,608

[22] Filed: Jun. 1, 1994

[30] Foreign Application Priority Data

Jun. 3, 1993 [JP] Japan .................. 5-156316

[51] Int. Cl.⁶ ............................................. F16C 33/62
[52] U.S. Cl. .................... 384/492; 384/469; 384/902; 384/907.1
[58] Field of Search .............. 384/907.1, 910, 913, 384/469, 492, 569, 625, 902

[56] References Cited

U.S. PATENT DOCUMENTS

| 3,212,834 | 10/1965 | Mayer et al. | 384/492 X |
| 3,782,794 | 1/1974 | Chmura et al. | 384/492 |
| 4,871,266 | 10/1989 | Oda | 394/492 X |
| 5,150,398 | 9/1992 | Nishioka et al. | 384/492 X |

FOREIGN PATENT DOCUMENTS 137621 8/1983 Japan .................. 384/492
3255224 11/1991 Japan .

Primary Examiner—Thomas R. Hannon
Attorney, Agent, or Firm—Browdy and Neimark

[57] ABSTRACT

This invention provides a structure of a nonmagnetic raceway assembly in which the raceway assembly itself is formed of a nonmagnetic material to improve the sliding performance and strength of the raceway surfaces. The nonmagnetic raceway assembly structure includes a pair of raceway bodies which have raceway forming surfaces made of a nonmagnetic metal material and which move relative to each other; and raceway layers adhering to the raceway forming surfaces to form raceway surfaces. The raceway layers are made of a nonmagnetic composite material and formed as a porous structure that can retain lubricating oil or lubricant. The raceway surfaces are disposed facing each other to form a raceway through which the rolling elements travel rolling.

11 Claims, 4 Drawing Sheets

NONMAGNETIC RACEWAY ASSEMBLY

BACKGROUND OF THE INVENTION

1. Field of the Invention

The present invention relates to a structure of a nonmagnetic raceway assembly that has raceway surfaces forming a raceway through which rolling elements such as balls or rollers travel.

2. Description of the Prior Art

In recent years, in home electric appliances, semiconductor manufacturing equipment, image processing equipment and inspection devices, there are growing demands for nonmagnetic raceway assemblies such as nonmagnetic bearings, in addition to such properties as corrosion resistance and surface pressure withstandability. Materials that have conventionally been used to manufacture nonmagnetic raceway assemblies such as bearings include stainless steel, aluminum, and beryllium copper.

A vacuum bearing disclosed in the Japanese Patent Laid-Open No. 255224/1991 forms rolling elements with ceramics such as silicon carbide and silicon nitride and coats their surfaces with molybdenum disulfide by sputtering. This vacuum bearing has the inner race and the outer race formed of ceramics such as silicon carbide and silicon nitride or stainless steel and coats their surfaces with molybdenum disulfide by sputtering. A retainer is formed of polytetrafluoroethylene. The vacuum bearings are used where lubrication cannot be realized by oil or grease, as in satellite-borne equipment, semiconductor manufacturing equipment and medical X-ray tubes. The vacuum bearings, as mentioned above, does not use lubricating oil or agent, nor does it improve brittleness of ceramics.

When the raceway assembly of a bearing is formed of such nonmagnetic materials as stainless steel, aluminum, and beryllium copper, characteristics such as stiffness, wear resistance, seizure resistance and durability of the raceway assembly itself are not good enough, nor is it possible to reduce the manufacturing cost of the raceway assembly. To overcome these drawbacks, however, attention is being focused on ceramics as a material for the raceway assembly, which has good characteristics such as stiffness, wear resistance, seizure resistance, durability and corrosion resistance.

Although ceramics, when compared with metallic materials, has excellent properties such as heat resistance, corrosion resistance, wear resistance and stability as well as light weight, it has drawbacks of low tensile strength and bending strength and fragility. Hence, various problems must be overcome before ceramics can replace metals as the material of the raceway assembly.

Materials with small strength are not preferred as the material forming the raceway surface of the bearing because the raceway surface is subjected to heavy load. It is therefore problematical to manufacture a bearing with ceramics. When the raceway assembly is formed of ceramics and if the bearing should fail, the effect of the bearing failure goes beyond the bearing itself, leading also to a failure of the equipment in which the bearing is used.

SUMMARY OF THE INVENTION

A major objective of the present invention is to solve the above-mentioned problems and to provide a nonmagnetic raceway assembly structure, in which the raceway body is formed of a nonmagnetic metal such as stainless steel; in which a raceway layer of a porous structure made of a nonmagnetic composite material including at least nonmagnetic ceramics is applied to the raceway forming surface of the raceway assembly to form the raceway body nonmagnetic, thus taking advantage of the ceramics features, and to improve such characteristics as corrosion resistance, surface pressure withstandability, strength, and the raceway surface's sliding performance.

In this nonmagnetic raceway assembly, the ceramics contained in the raceway layer is a nonmagnetic ceramics selected from $Si_3N_4$, $ZrO_2$ and $SiC$.

The nonmagnetic raceway assembly structure is characterized in that the raceway assembly itself is formed nonmagnetic and that the porous structure of the raceway layer can retain lubricating oil or agent, improving the lubricating performance and sliding performance of the raceway surface, allowing smooth travel of the rolling elements in the raceway.

Further, because the raceway layer of the nonmagnetic raceway assembly is formed of a composite material containing ceramics, it is light in weight and has high wear resistance, corrosion resistance and heat resistance. Thus, there is little wear and almost no galling or seizure occurs.

In addition, this nonmagnetic raceway assembly has the raceway body made of hard stainless steel coated with a composite material containing at least ceramics, so that characteristics such as surface pressure withstandability, strength and corrosion resistance are improved.

Because of the features mentioned above, this nonmagnetic raceway assembly is suitably applied for bearings, linear-motion rolling guide units and ball splines used in home electric appliances, semiconductor fabricating equipment, image processing devices, and inspection equipment.

The process of manufacturing this nonmagnetic raceway assembly structure consists in fabricating the raceway body having a raceway forming surface made of a nonmagnetic material such as stainless steel; making a nonmagnetic composite material containing at least nonmagnetic ceramic powder; melting the nonmagnetic composite material; spraying the melted nonmagnetic composite material by compressed air from a nozzle against the raceway forming surface to deposit a film of the composite material and form a raceway layer of porous structure on the raceway forming surface; and working the surface of the raceway layer to make it the raceway surface.

Hence, the raceway layer in this nonmagnetic raceway assembly is formed porous during the spraying process by the presence of compressed air in the sprayed coating. This porous structure forms a lubricating oil or agent retaining region, reducing the manufacturing cost.

By mixing nonmagnetic ceramic powder and nonmagnetic metallic powder to form the nonmagnetic composite material, it is possible to strengthen the firmness with which the sprayed coating of the raceway layer adheres to the raceway body.

DETAILED DESCRIPTION OF THE EMBODIMENTS

Embodiments of the nonmagnetic raceway assembly according to this invention will be described. The nonmagnetic raceway assembly of this invention consists of a raceway body having a raceway forming surface made of a nonmagnetic metallic material such as stainless steel; and a raceway layer fixedly adhering to the raceway forming surface and having a raceway surface of a porous structure made of a nonmagnetic composite material that contains at least a nonmagnetic ceramics. The nonmagnetic raceway assembly can be applied to the inner and outer races of roller bearings, the track rails in linear motion rolling guide units and the slider casings mounted astride on the track rails, and also to the sliders and raceway shafts of ball splines. Ceramics contained in the raceway layer are chosen from nonmagnetic ceramics such as $Si_3N_4$, $ZrO_2$ and $SiC$.

Figure 1:
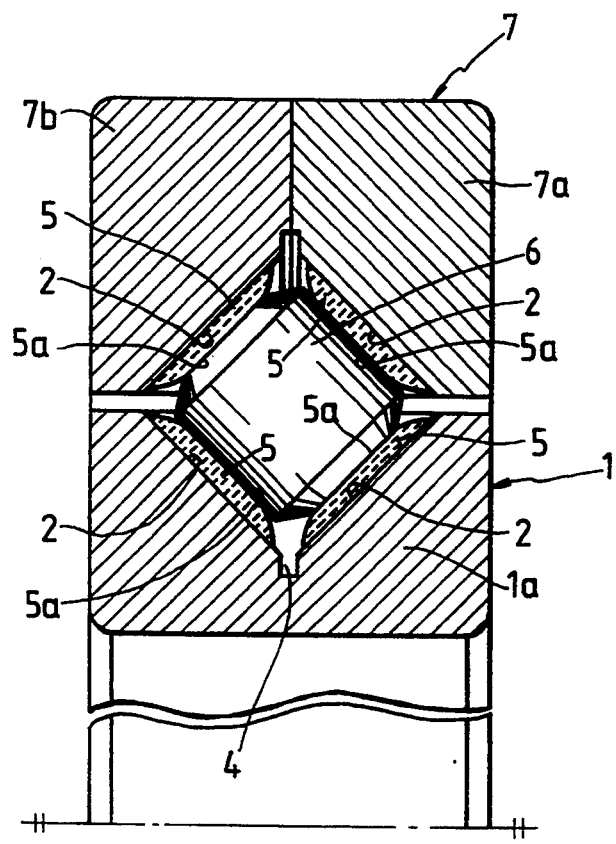
FIG. 1 is a fragmentary cross section showing a roller bearing as one embodiment of the nonmagnetic raceway assembly structure according to this invention.
Figure 2:
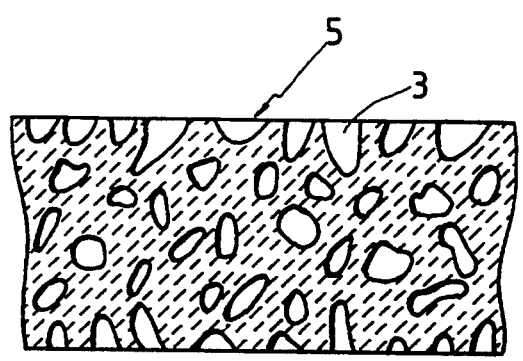
FIG. 2 is an enlarged cross section showing one example composition of the raceway layer in the nonmagnetic raceway assembly.

An embodiment of this nonmagnetic raceway assembly as applied to a roller bearing is described by referring to FIGS. 1 and 2.

The roller bearing includes cylindrical rollers 6 constituting rolling elements, and an inner race 1 and an outer race 7, both having raceway surfaces 5a for the cylindrical rollers 6. An inner race body 1a constituting the inner race 1 and outer race bodies 7a, 7b constituting the outer race 7 are made from stainless steel, a nonmagnetic material. The inner race body 1a is formed at its central outer circumference with an escape 4, which is an annular groove. On the outer circumference of the inner race body 1a, inclined surfaces are formed on both sides of the escape 4 to provide raceway forming surfaces 2 in the form of a V-shaped groove, along which a large number of cylindrical rollers 6 travel rolling.

The outer race 7 has a pair of outer race bodies 7a, 7b divided at the center of its width in the axial direction. The outer raceway bodies 7a, 7b are made from nonmagnetic stainless steel and assembled integrally into the outer race 7 by bolts and nuts. The outer race bodies 7a, 7b are formed at their inner circumferences with inclined surfaces to provide raceway forming surfaces 2 in the form of a V-shaped groove, along which a large number of cylindrical rollers travel rolling.

Further, the raceway forming surfaces 2 of the inner race body 1a and the raceway forming surfaces 2 of the outer race bodies 7a, 7b are coated with raceway layers 5, which have a porous structure containing at least nonmagnetic ceramics. The porous structure of the raceway layer 5 has a number of fine open pores 3 that can retain lubricating oil or lubricating agent and thereby improve the sliding characteristic of a slider. The raceway layer 5 has a raceway surface 5a on which the cylindrical rollers 6 as rolling elements travel.

While the nonmagnetic raceway assembly employs cylindrical rollers 6 as rolling elements in the above embodiment, it can similarly be applied to conical cross roller bearings that use conical rollers. The nonmagnetic raceway assembly can also be applied to cross roller bearings in which a large number of cylindrical rollers 6 are arranged alternately in two crossing directions. In addition to being formed as a full type roller bearing, the cross roller bearing may be formed as one in which separators are installed between the adjacent rollers, or as a bearing having a holder.

Figure 3:
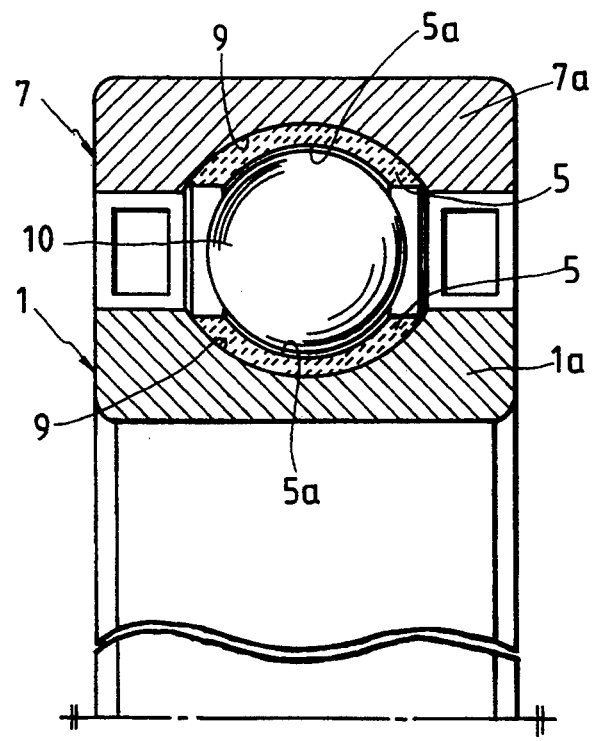
FIG. 3 is a fragmentary cross section showing a ball bearing as another embodiment of the nonmagnetic raceway assembly according to this invention.

Next, by referring to FIG. 3, another embodiment of the nonmagnetic raceway assembly will be described. This embodiment concerns the nonmagnetic raceway assembly of the present invention as applied to a ball bearing. In the ball bearing shown in FIG. 3, components that perform similar functions to those of the roller bearing of FIG. 1 are given like reference numerals. The ball bearing of FIG. 3 has basically the same configuration as the roller bearing of FIG. 1.

An inner race body 1a of the inner race 1 and an outer race body 7a of the outer race 7 are made from stainless steel, a nonmagnetic material, and have arc raceway grooves 9—raceway forming surfaces along which a number of balls 10 travel rolling. The surface of each raceway grooves 9 is coated with a raceway layer 5 of porous structure, as with the preceding embodiment. The raceway layer 5 is formed with a large number of fine open pores 3 that retain lubricating agent.

Figure 4:
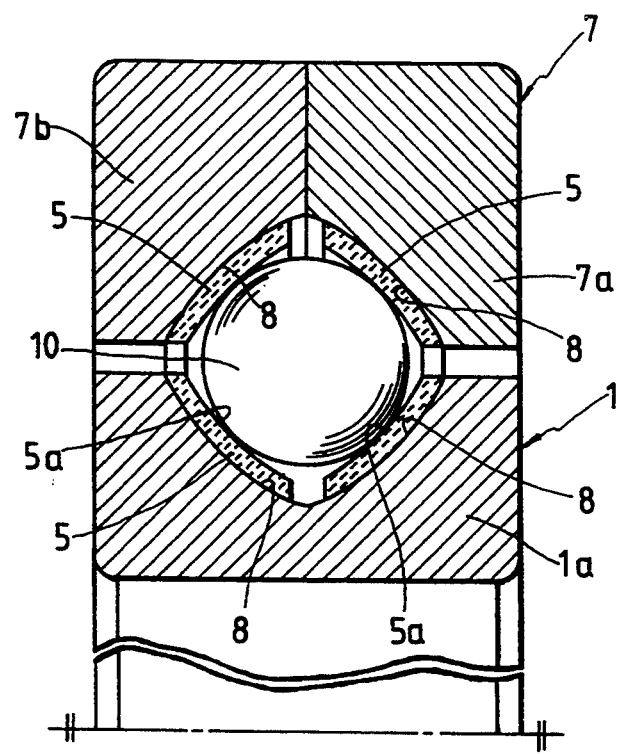
FIG. 4 is a fragmentary cross section showing a ball bearing as a further embodiment of the nonmagnetic raceway assembly according to this invention.

Next, by referring to FIG. 4, a further embodiment of the nonmagnetic raceway assembly will be described. This embodiment concerns a case where the nonmagnetic raceway assembly of this invention is applied to another type of ball bearing. In the ball bearing shown in FIG. 4, components that perform similar functions to those of the roller bearing of FIG. 1 are given like reference numerals. The ball bearing of FIG. 4 has basically the same configuration as the roller bearing of FIG. 1, except that it differs from the type of FIG. 3 and that the raceway surfaces 5a have a greater curvature than that of the balls 10 so that each ball 10 is supported with four points on the raceway surfaces 5a.

The V-shaped raceway forming surfaces 8 of the inner race 1, formed as a raceway groove of the inner race body 1a, are coated with raceway layers 5 of porous structure. The outer race 7 consists of two divided outer race bodies 7a, 7b, whose inner circumferential surfaces are each formed with raceway forming surfaces 8 of the outer race 7, which are coated with raceway layers 5 of porous structure. The raceway layers 5 of porous structure has raceway surfaces 5a along which the balls 10 travel. The open pores 3 of porous structure are soaked with and retain lubricant. Because lubricant is retained in the raceway layers 5, the bearing has improved surface pressure withstandability and sliding characteristic.

Figure 5:
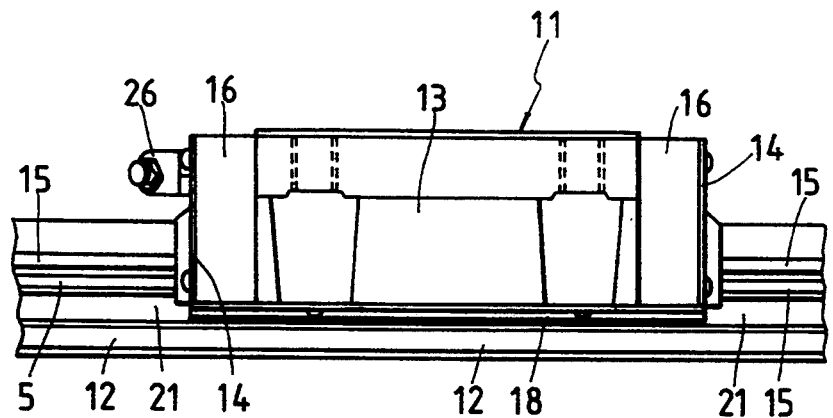
FIG. 5 is a side view showing a linear motion rolling guide unit that uses the nonmagnetic raceway assembly of this invention.
Figure 6:
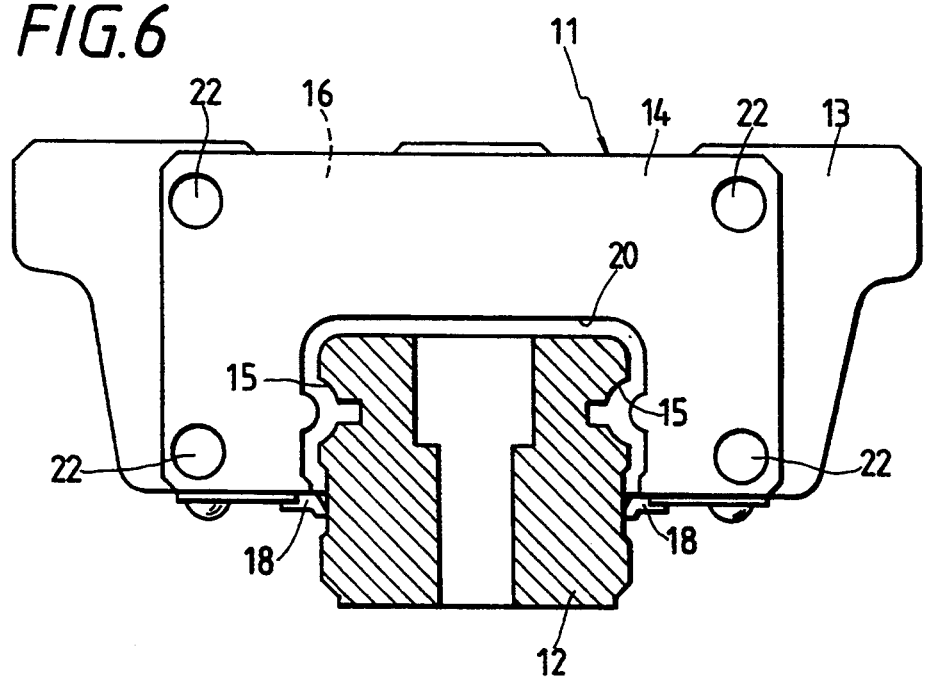
FIG. 6 is a cross section showing the linear motion rolling guide unit of FIG. 5.
Figure 7:
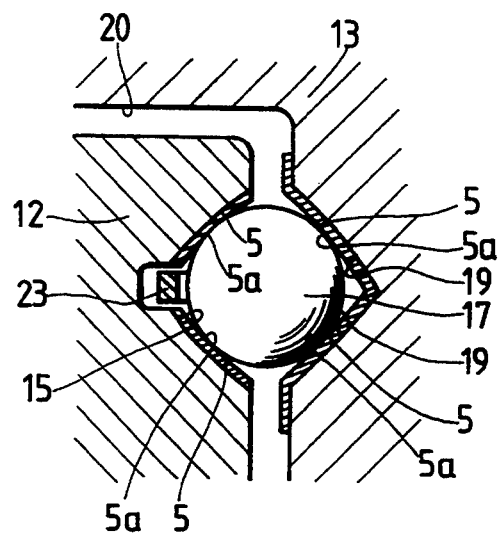
FIG. 7 is an enlarged cross section showing one embodiment of a raceway surface of the linear motion rolling guide unit of FIG. 5.

Next, by referring to FIG. 5, 6 and 7, explanation is given to another embodiment where the nonmagnetic raceway assembly of this invention is applied to a linear motion rolling guide unit.

The linear motion rolling guide unit includes a track rail 12 mounted on a base, and a slider 11 mounted astride slidably on the track rail 12. The track rail 12 has raceway forming surfaces 15 on longitudinally extending side surfaces 21 thereof on both sides. The slider 11 has casings 13, end caps 16 fixed to the longitudinal ends of each casing 13, and end seals 14 attached to the end surfaces of the end caps 16. The casing 13 and the end caps 16 are formed at their underside with rail insertion recesses 20 that accommodate the track rail 12 so that the casing 13 and the end caps 16 can slide on the track rail 12.

The slider 11 is slidable relative to the track rail 12, and includes the casing 13 having raceway forming surfaces 19 at positions facing the raceway forming surfaces 15; a large number of rolling elements 17 such as balls or cylindrical rollers (in the figure, balls are shown) that are movably trapped between the raceway forming surfaces 15 and the raceway forming surfaces 19 to allow relative motion of the slider and the track rail; an under seal 18 that seals between the track rail 12 and the casing 13; and end caps 16 attached to the longitudinal ends of the casing 13, the longitudinal direction being the same as the sliding direction of the casing. Further, to prevent the rolling elements 17 from slipping out of the casing 13, retainer bands 23 that hold the rolling elements 17 in place are mounted to the casing 13.

The end caps 16 are fitted with end seals 14 to seal between the track rail 12 and the slider 11 and also provided with a grease nipple 26 to supply lubricant to the sliding surfaces between the track rail 12 and the slider 11. The end caps 16 are mounted to the end surfaces of the casing 13 by passing screws 22 through mounting holes. The end caps 16 are formed with direction changing paths (not shown) for changing the direction of travel of the rolling elements 17 to circulate them.

In the linear motion rolling guide unit which is constructed as described above, the slider 11 mounted astride on the track rail 12 can slide freely on the track rail 12 by the action of the rolling elements 17 that travel rolling along the raceway forming surfaces 15 of the track rail 12. The loaded rolling elements 17 running along the raceway forming surfaces 15 of the track rail 12 are led into the direction changing paths formed in the end caps 16 and further into return passages formed in the upper part of the casing 13 parallel to the raceway forming surfaces 19. In this way, the rolling elements 17 circulate through an endless circulation passage. By the rolling motion of the loaded rolling elements 17 situated between the raceway forming surfaces 19 of the casing 13 and the raceway forming surfaces 15 of the track rail 12, the track rail 12 and the slider 11 can be slidably moved relative to each other.

In this linear motion rolling guide unit, as shown in FIG. 7, the raceway forming surfaces 15 of the track rail 12 and/or the raceway forming surfaces 19 of the casing 13 are firmly coated with raceway layers 5, on which are formed raceway surfaces 5a. The raceway layers 5 and raceway surfaces 5a are similar to those of the preceding embodiments and therefore their explanations are omitted here.

Figure 8:
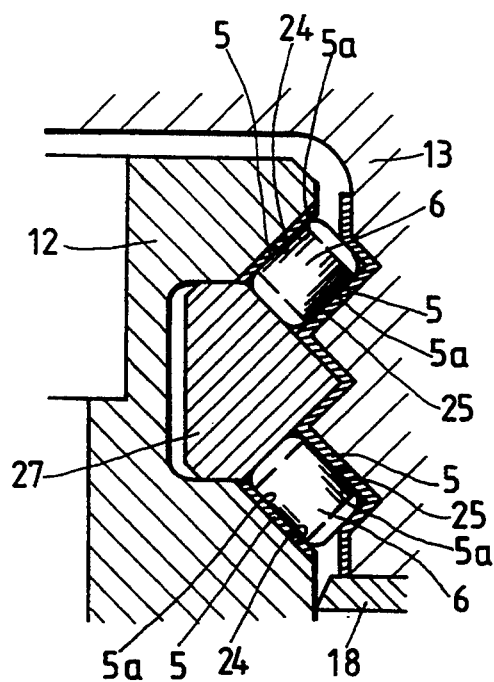
FIG. 8 is an enlarged cross section showing another embodiment of a raceway surface of the linear motion rolling guide unit using the nonmagnetic raceway assembly of this invention.

FIG. 8 shows another embodiment of the linear motion rolling guide unit. This linear motion rolling guide unit includes a track rail 12; a casing 13 forming a slider mounted astride the track rail 12; cylindrical rollers 6 running through the raceway formed between the raceway forming surfaces 24 of the track rail 12 and the raceway forming surfaces 25 of the casing 13; and under seals 18 arranged at the underside of the casing 13. The cylindrical rollers 6 are retained in the casing 13 by a retainer 27 attached to the casing 13. The raceway forming surfaces 25 of the casing 13 and the raceway forming surfaces 24 of the track rail 12 are each coated with raceway layers 5, which are formed with raceway surfaces 5a. The raceway layers 5 and raceway surfaces 5a are similar to those of the preceding embodiments and therefore their explanations are omitted here.

The nonmagnetic raceway assembly of this invention can be manufactured in the following way. In the process of manufacturing this nonmagnetic raceway assembly, the raceway body having the raceway forming surfaces is fabricated using a nonmagnetic material such as stainless steel, and also a nonmagnetic composite material containing at least nonmagnetic ceramics powder is made. The nonmagnetic ceramics may be selected from $Si_3N_4$, $ZrO_2$ [partially stabilized zirconia (Y-PSZ)], and SiC. The nonmagnetic composite material is melted by arc, plasma arc or flame and the melted nonmagnetic composite material is sprayed by compressed air from the nozzle against the raceway forming surfaces of the raceway body to form a composite film on the raceway forming surfaces.

To manufacture the nonmagnetic composite material, it is possible to mix nonmagnetic ceramic powder and nonmagnetic metal powder. The nonmagnetic metal powder may include Al, Ni, and Cr. By adding nonmagnetic metal powder to the nonmagnetic composite material, it is possible to strengthen the firmness with which the sprayed coating of the raceway layer adheres to the raceway body. It is of course possible to make the nonmagnetic material by mixing different nonmagnetic ceramics.

During the spray process, the raceway layer is made porous by the presence of compressed air in the sprayed coating. Next, the surface of the raceway layer is mechanically worked to form a raceway surface on which the rolling element can move rolling. By being subjected to machining processes such as cutting and polishing, the surface of the raceway layer is formed with a large number of minute recesses, or exposed open pores. These open pores in the raceway layer form a porous structure that can be soaked with and retain lubricating oil or lubricant and thereby improve the surface pressure withstandability, lubricating performance and sliding performance of the nonmagnetic raceway assembly.

The structure of the nonmagnetic raceway assembly according to this invention, as mentioned above, can be applied to the manufacture of inner and outer races of the roller bearings, a track rail and a slider casing mounted slidably astride the track rail in the linear motion rolling guide unit, or to the manufacture of a slider and a raceway shaft of the ball splines.

I claim:

1. A structure of a nonmagnetic raceway assembly comprising:
   a pair of raceway bodies made of a nonmagnetic metal material and having raceway forming surfaces, the pair of raceway bodies moving relative to each other; and
   raceway layers adhering to the raceway forming surfaces to form raceway surfaces, the raceway layers being made of a nonmagnetic composite material of a porous structure that can retain any one of lubricating oil and lubricant;

wherein the raceway surfaces of the relatively moving raceway bodies face each other to form a raceway through which rolling elements can travel rolling.

2. A structure of a nonmagnetic raceway assembly according to claim 1, wherein the nonmagnetic metal material that forms the raceway bodies is stainless steel.

3. A structure of a nonmagnetic raceway assembly according to claim 1, wherein the nonmagnetic composite material contains at least nonmagnetic ceramics.

4. A structure of a nonmagnetic raceway assembly according to claim 3, wherein the nonmagnetic ceramics contained in the raceway layer is selected from $Si_3N_4$, $ZrO_2$ and SiC.

5. A structure of a nonmagnetic raceway assembly according to claim 1, wherein the nonmagnetic composite material is a mixture of a nonmagnetic ceramics powder and a nonmagnetic metal powder.

6. A structure of a nonmagnetic raceway assembly according to claim 1, wherein the raceway layer is formed of a composite material film of a porous structure, which is formed by spraying the melted nonmagnetic composite material by compressed air from a nozzle against the raceway forming surfaces.

7. A structure of a nonmagnetic raceway assembly according to claim 6, wherein the raceway surfaces are formed by working the surface of the composite material film.

8. A structure of a nonmagnetic raceway assembly according to claim 1, wherein one of the paired raceway bodies is an inner race and the other is an outer race that rotates relative to the inner race.

9. A structure of a nonmagnetic raceway assembly according to claim 8, wherein the outer race comprises a pair of outer race bodies divided at a longitudinal center along a plane perpendicular to the axis thereof.

10. A structure of a nonmagnetic raceway assembly according to claim 1, wherein one of the paired raceway bodies is a track rail and the other is a casing that slides on the track rail.

11. A structure of a nonmagnetic raceway assembly according to claim 1, wherein one of the paired raceway bodies is a raceway shaft and the other is a slider that slides on the raceway shaft.

* * * * *